US007344278B2

(12) United States Patent
Paravantsos

(10) Patent No.: US 7,344,278 B2
(45) Date of Patent: Mar. 18, 2008

(54) LUMINAIRE WITH REFLECTOR OF ADJUSTABLE ROTATION

(75) Inventor: Antonios Paravantsos, Thessaloniki (GR)

(73) Assignee: Pilux & Danpex A.G., Salonika (GR)

( * ) Notice: Subject to any disclaimer, the term of this patent is extended or adjusted under 35 U.S.C. 154(b) by 0 days.

(21) Appl. No.: 11/359,350

(22) Filed: Feb. 22, 2006

(65) Prior Publication Data

US 2007/0195531 A1 Aug. 23, 2007

(51) Int. Cl.
*B60Q 1/14* (2006.01)

(52) U.S. Cl. ...................... 362/283; 362/224; 362/322; 362/449

(58) Field of Classification Search ........ 362/282-284, 362/322-324, 319, 449, 222, 224
See application file for complete search history.

(56) References Cited

U.S. PATENT DOCUMENTS 6,206,548 B1 * 3/2001 Lassovsky .................. 362/283

* cited by examiner

*Primary Examiner*—Sandra O'Shea
*Assistant Examiner*—Gunyoung T. Lee
(74) *Attorney, Agent, or Firm*—Charles E. Bruzga; Bruzga & Associates

(57) ABSTRACT

Luminaire with reflector of adjustable rotation comprises a luminaire housing, a reflector received in the housing and an assembled component at ends of reflector. Each longitudinal end of the luminaire has a recess and a projection on internal surface, the recess defining a circular arc, with center as longitudinal axis of a fluorescent lamp. Each assembled component has first and second axially outwardly protruding parts, cooperating with an associated recess and projection, respectively. The first part is received in the recess for guiding rotation of the reflector. The second part has a circular arced, toothed surface concentric with its associated recess, and cooperating with an associated projection that engages a respective one of a plurality of cavities of the toothed surface, to secure the reflector in a respective one of a plurality of rotational positions. Locations of recess and projection can be interchanged with locations of first and second parts.

19 Claims, 5 Drawing Sheets

LUMINAIRE WITH REFLECTOR OF ADJUSTABLE ROTATION

FIELD OF THE INVENTION

The present invention relates to a luminaire with reflectors of adjustable rotation. More, particularly, the invention relates to a luminaire with reflectors that are securely held at various positions while being able to rotate.

BACKGROUND OF THE INVENTION

In prior luminaires, the parabolic reflectors that are mounted behind the fluorescent lamps and can rotate around the longitudinal axis of the lamp at the previous technical level are those reflectors that are supported on the fluorescent lamp through transverse louvers. The lamp passes through the circular openings of the louvers which are assembled on the reflector body. These reflectors do not rotate in steps in order to have fixed positions e.g. by 1°, 2° or 4°. Also, the reflector is not retained at a specific rotating position, since it is held in its place due to the friction developed between the internal surface of the louvers and the external surface of the lamp.

In accordance with the invention, a more accurate adjustment of the parabolic reflectors in certain positions around the imaginary axis of the fluorescent lamp could be ensured by the use of a system for the rotation of parabolic reflectors in steps. For e.g. 1° or 2° at various positions where the reflector can lock and cannot move, in case it is accidentally touched by human hand. As a result, it is easier to concentrate and direct the light beam reflected on the reflector from the fluorescent lamp. Such an adjustable rotation system for reflectors would be very useful if it could be easily incorporated into fluorescent luminaire housings using a simple procedure and without special manufacturing requirements for the luminaire housing or the reflector itself.

According to this invention, the reflector can be used inside luminaire housings where it can rotate around the fluorescent lamp by some degrees so that the light will be concentrated and directed as required, enhancing significantly the light performance of the luminaire and saving electric energy.

SUMMARY OF THE INVENTION

In accordance with one form of the invention, a luminaire with reflector of adjustable rotation is provided, which comprises a luminaire housing with two longitudinal ends. A reflector for a fluorescent lamp is received in the luminaire and has two longitudinal ends. Each longitudinal end of the luminaire housing has a recess and a projection on an internal surface, the recess defining a circular arc having its center as a longitudinal axis of the fluorescent lamp. Each longitudinal end of the reflector has an assembled component cooperating with an associated recess and projection of the luminaire. Each assembled component has first and second axially outwardly protruding parts, the first part being received in an associated recess of the luminaire. The second part has a circular arced, toothed surface concentric with the associated recess, which guides rotation of the reflector after receiving the first part. The associated projection engages a respective one of a plurality of cavities of the toothed surface to secure the reflector in a respective one of a plurality of rotational positions.

In another form of the invention, the locations of the recess and projection and of the first and second parts are changed.

The parabolic reflector of this invention is secured in its place and rotated in the side walls of the luminaire housing without having to be supported on the fluorescent lamps. More specifically, the reflector rotates in steps of 1° or 2° or more and locks into each rotating position to avoid any movement in case it is accidentally pushed.

DETAILED DESCRIPTION OF THE INVENTION

Figure 1:
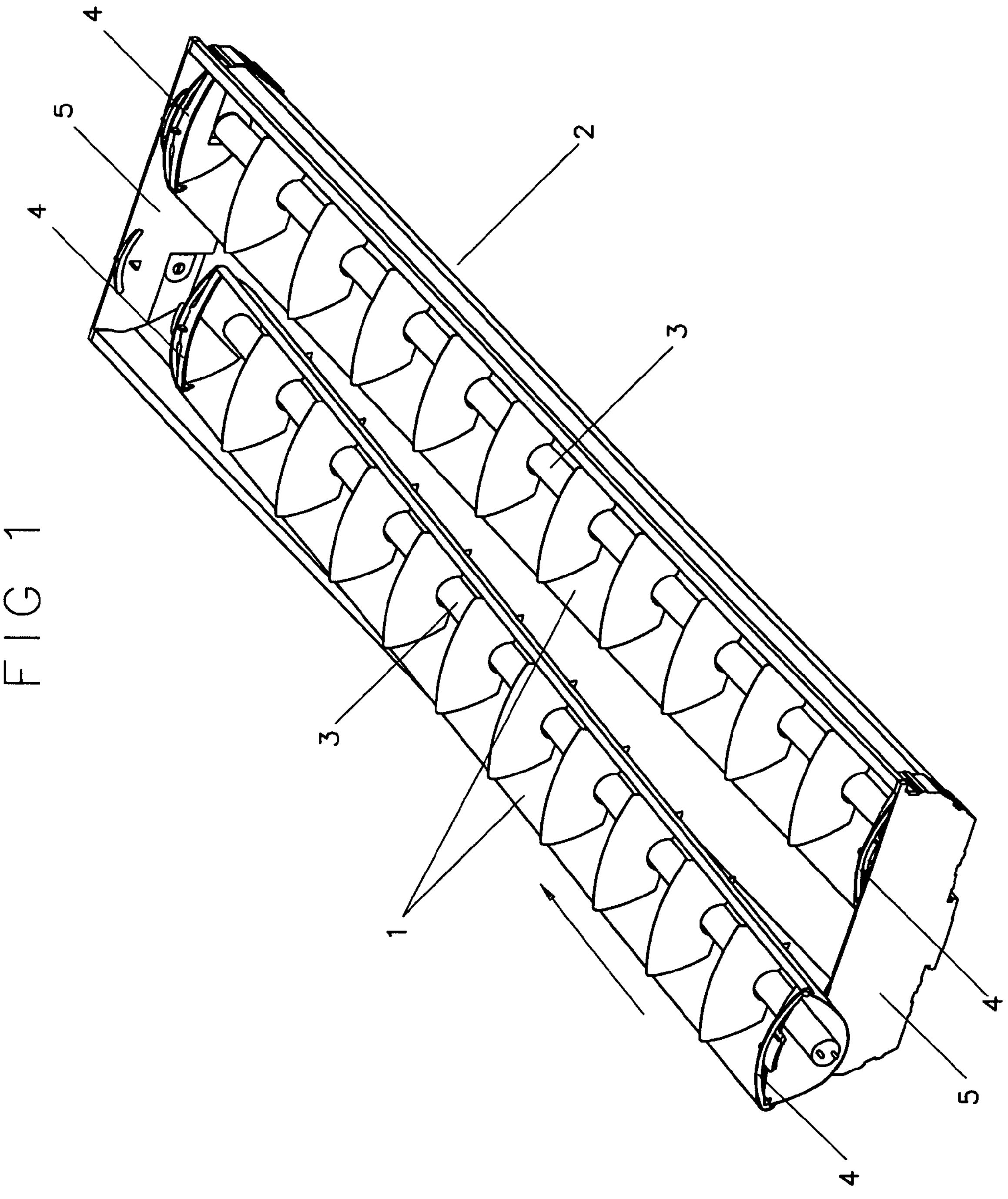
FIG. 1 is a perspective view of the reflector embodied within the fluorescent luminaire.
Figure 2:
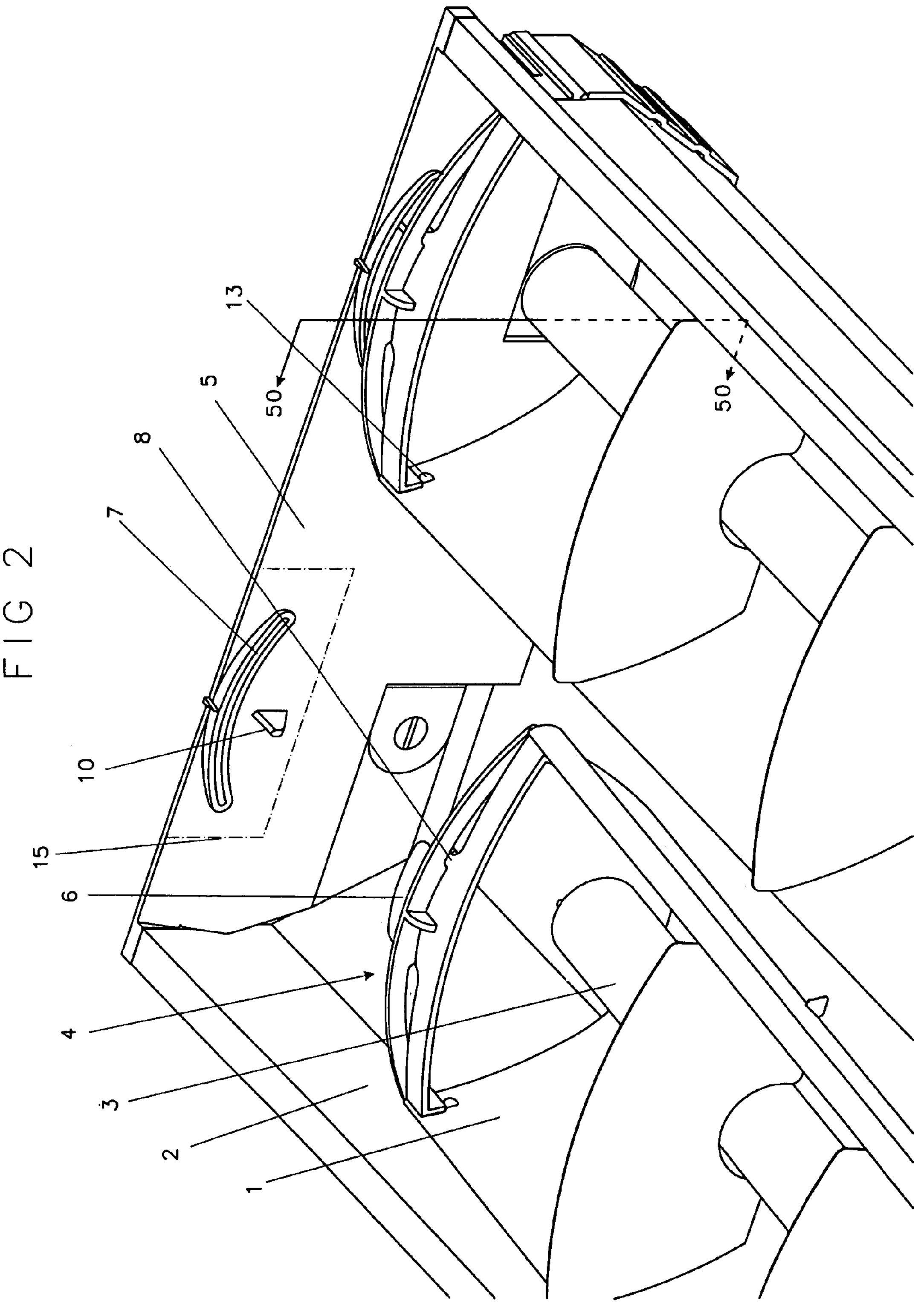
FIG. 2 is a detailed view of the support and rotation mechanism of the reflector inside the luminaire.
Figure 3:
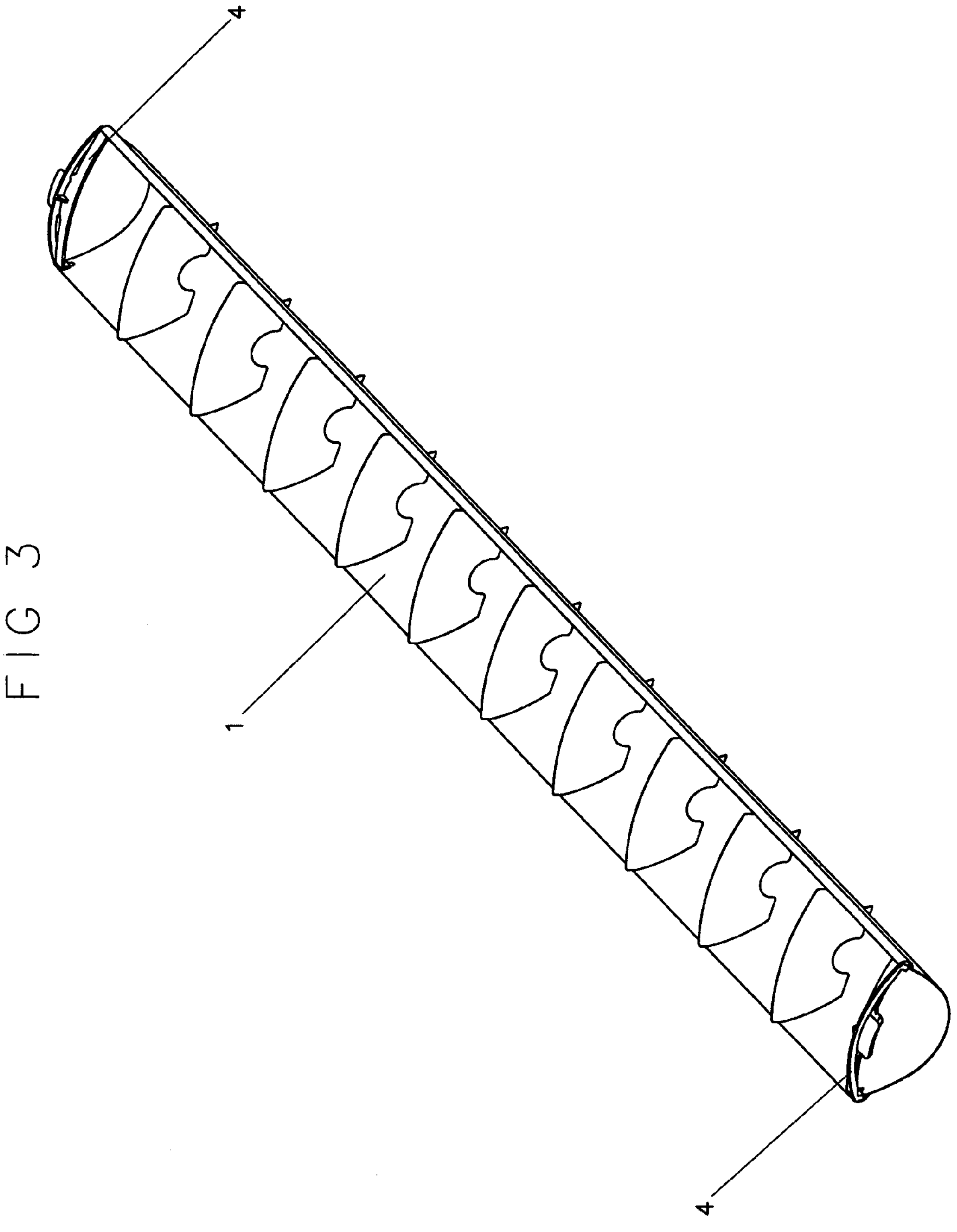
FIG. 3 is a perspective view of the reflector.
Figure 4:
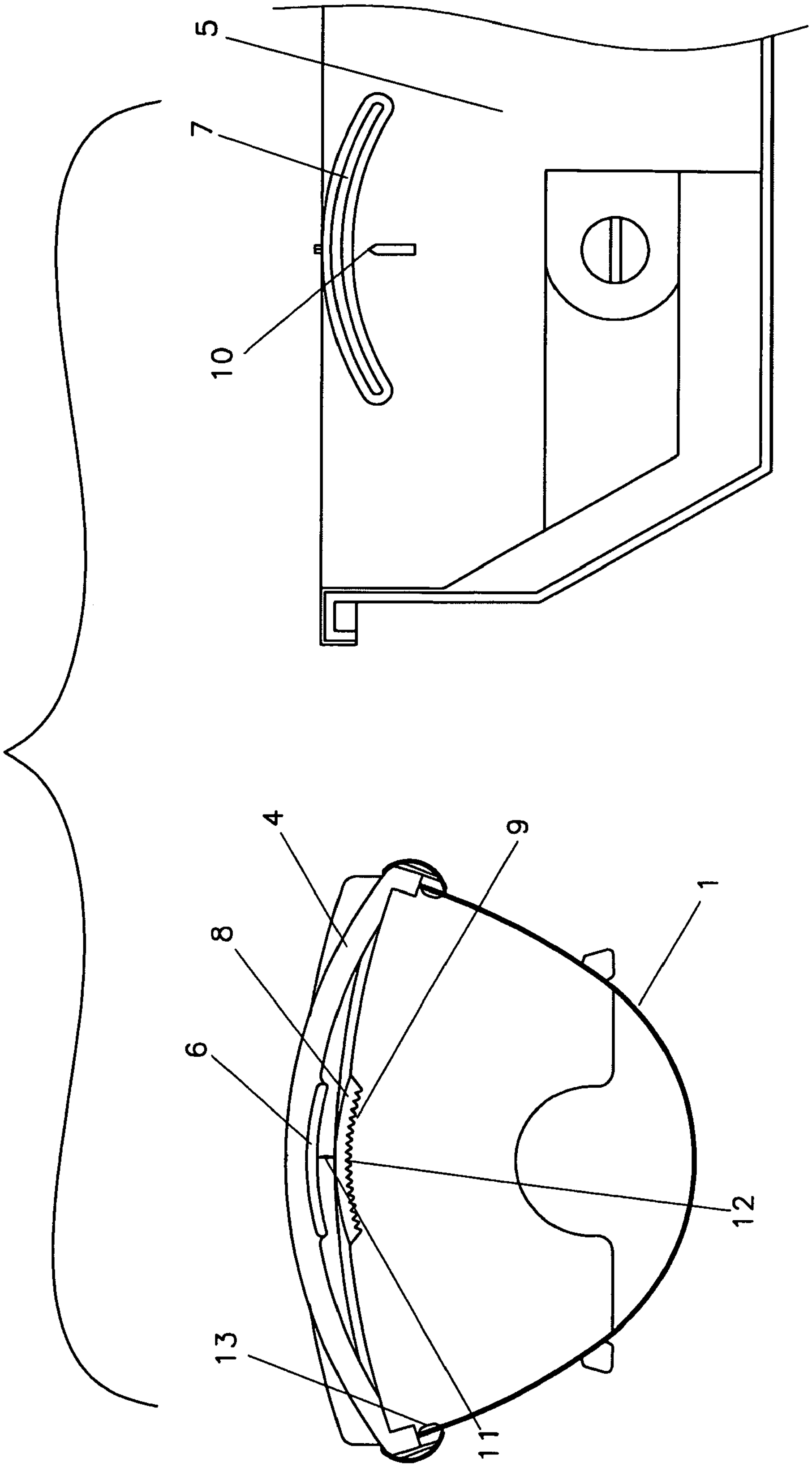
FIG. 4 is a front view of the reflector's end and a front view of the side end wall of the luminaire.
Figure 5:
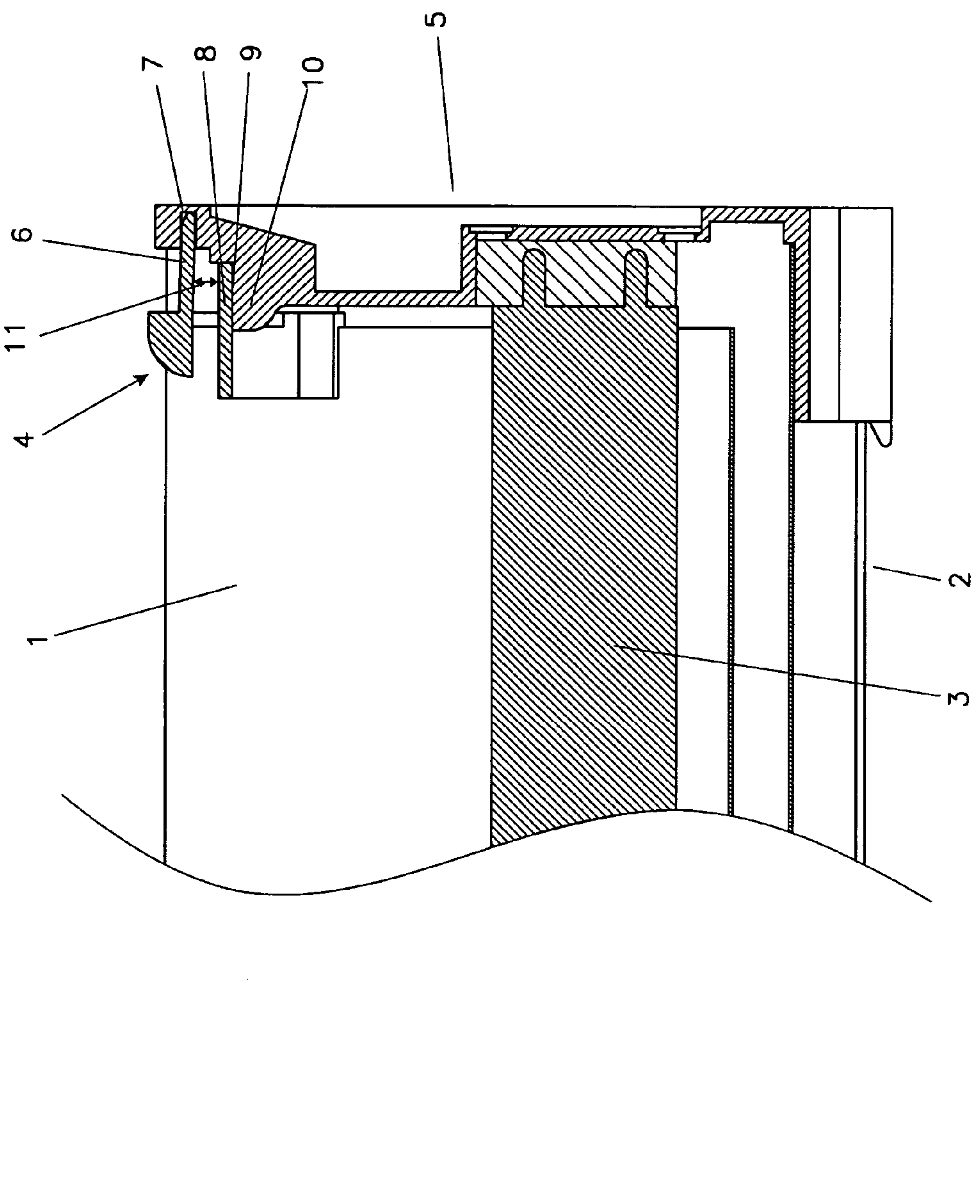
FIG. 5 is a cross section view of an end of a reflector attached to an end of a luminaire housing, taken at Arrows 50-50 of FIG. 2.

According to a first embodiment of the invention, FIG. 1 shows a reflector 1 inside a luminaire housing 2 of a luminaire, placed beneath fluorescent lamps 3. The reflector 1 is generally parabolic and preferably comprises single integral part. As shown in FIG. 2, reflector 1 is fitted at both ends with an assembled component 4, which is supported and rotated in side end walls 5 of the luminaire. FIG. 3 shows the parabolic reflector alone, together with its components 4. As shown in FIGS. 4 and 5, each component 4 has first 6 and second 8 brackets (or parts), protruding axially outwardly from reflector 1. These parts are preferably parallel to a longitudinal axis of an associated fluorescent lamp but will still function if the parts are not exactly parallel to such axis. Second bracket 8 of each component has a toothed surface whose pattern as shown is referred to in this specification and claims as a saw-tooth pattern. The assembled component 4 enables rotation of the reflector.

As shown in FIGS. 2, 4 and 5, the reflector 1 is secured in its place and rotated by means of a protruding bracket 6 inside recess 7 of the side end wall 5 of the luminaire housing 2. The reflector 1 is locked in its rotating position when cavities 12 of toothed surface 9 of protruding bracket 8 engage with projection 10. Projection 10 protrudes from the side end walls 5 of the luminaire housing 2 and substantially conforms to the shape of the cavities 12 of the toothed surface 9.

During the rotation of the reflector 1 from one position to the other, distance 11 (FIGS. 4 and 5) between the protruding bracket 6 and the protruding bracket 8 ensures that the toothed surface 9 is lifted from the projection 10 due to the flexibility of the protruding bracket 8 that bears the toothed surface 9. The reflector 1 is rotated in steps, whereby one step is the distance from one cavity 12 to the other cavity of the toothed surface 9.

In one application of this invention, the two protruding brackets 6 and 8 have the form of a circle arc. The circles to which the arcs of bracket 6 and 8 belong are the circles with center as the longitudinal axis of the associated fluorescent lamp 3 and with radius as the vertical distance from the longitudinal axis of fluorescent lamp 3 until the middle of the brackets 6 and 8. The circle of the arc of bracket 6 is concentric to the circle of the arc of bracket 8. The carriers of the two protruding brackets have small thickness and enough length so that the brackets will be flexible enough to draw apart and move closer again.

The recess 7 (FIGS. 4 and 5) at the side end wall 5 of the luminaire housing 2 also forms a circular arc with same radius as the circle of the bracket 6. This leads bracket 6 inside the recess 7 and causes the whole reflector 1 to be rotated along with the longitudinal axis of lamp 3.

At the side end wall 5 of the luminaire housing 2 there is also the toothed projection 10 of the same cross section as the cavities 12 of the toothed surface 9 of the protruding bracket 8. During the rotation of the reflector 1 the toothed surface 9 is rotated as well, and tries to overcome the engagement with projection 10.

Due to the flexibility of the brackets 6 and 8 in every step of the reflector's 1 rotation, the bracket 8 is lifted so as to overcome the resistance of projection 10 and it moves towards the bracket 6. This causes the toothed surface 9 to be disengaged from the projection 10 and then to be engaged again with its next cavity.

As mentioned above, the carrier of the protruding bracket 6 is also flexible when moving parallel to the longitudinal axis of the reflector 1 so that the bracket 6 will be easily extracted from recess 7 of the side end wall 5, by a simple push with the human finger on the middle of the bracket's 6 carrier in a direction parallel to the longitudinal axis of the parabolic reflector 1.

Projections 13 of the assembled component 4 lock into the holes at the longitudinal ends of the reflector 1 and thus ensure the secure mounting of the component 4 on the reflector 1.

Referring to FIGS. 2 and 5, in another embodiment of the invention, the location of various of the described parts can be changed, as follows. One "arrangement" is considered to include end wall portion 15 of the housing and its associated recess 7 and projection 10, and an other "arrangement" is considered to include brackets 6 and 8. The mounting locations of the one arrangement and the other arrangement can be interchanged, such that recess 7 and projection 10 become mounted on an assembled component (not shown) attached to longitudinal ends of the reflector, and brackets 6 and 8 become mounted onto end wall portion 15 of the housing. The working of this embodiment is similar to the present invention.

The assembled component 4 can be made of thermoplastic material, more preferably with polycarbonate or polyamide or acrylonitrile butadiene styrene or polystyrol or other similar materials. In another version, the component 4 can be made of metal sheet such as iron sheet or aluminum. The component 4 may be an integral item so that the brackets 6 and 8 are made of the same material.

The reflector is made of aluminum or synthetic film with specular or diffuse reflective surface. The synthetic film may be a single or multilayered plastic film such as PET, PP, PVC or a multilayered press paper in combination with preferably plastic film with typically 0.1 mm to 1 mm thickness.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. A luminaire having a lamp and a reflector that is rotational about an axis of rotation, comprising:

a) a luminaire housing with two longitudinal ends;

b) a lamp with a longitudinal axis and a first and second end;

c) a reflector for a fluorescent lamp; the reflector being received in the luminaire and having two longitudinal ends;

d) an interior of a longitudinal end of a luminaire housing and a longitudinal end of the reflector having first and second arrangements, respectively, or second and first arrangements, respectively;

i) the first arrangement comprising:

(1) a circular arc-shaped recess defined between a pair of spaced arc-shaped walls; the recess opening axially with respect to said longitudinal axis; and (2) a projection;

ii) the second arrangement comprising:

(1) first and second parts protruding axially with respect to said longitudinal axis; and (2) the first part being received in an associated recess of the first arrangement; and (3) the second part having a circular arced, toothed surface concentric with said associated recess;

e) the recess being for guiding rotation of the reflector after receiving the first part; and the associated projection engaging a respective one of a plurality of cavities of the toothed surface to secure the reflector in a respective one of a plurality of rotational positions.

2. The luminaire of claim 1, wherein said axis of rotation is spaced from the reflector to allow said axis of rotation to pass through the first and second ends of the lamp.

3. The luminaire of claim 2, wherein said reflector is the only reflector in the luminaire associated with the fluorescent lamp.

4. The luminaire of claim 2, wherein each axially outwardly projecting past is parallel to said longitudinal axis.

5. The luminaire of claim 2, wherein the reflector comprises a single integrated part.

6. The luminaire of claim 2, wherein the first and second parts of the assembled component comprises a single integrated part.

7. The luminaire of claim 2, wherein a) the cavities of the toothed surface have a saw-tooth pattern; and b) a portion of the projection that engages a cavity of the toothed surface substantially conforms to the shape of the cavity.

8. The luminaire of claim 1, wherein said reflector is the only reflector in the luminaire associated with the fluorescent lamp.

9. The luminaire of claim 3, wherein said reflector is parabolic in shape.

10. A luminaire having a lamp and a reflector that is rotational about a longitudinal axis of rotation, comprising:

a) a luminaire housing with two longitudinal ends;

b) a parabolic reflector for a fluorescent lamp; the reflector being received in the luminaire and having two longitudinal ends; and c) an interior of a longitudinal end of a luminaire housing and a longitudinal end of the parabolic reflector having first and second arrangements, respectively, or second and first arrangements, respectively;

i) the first arrangement comprising:

(1) a recess opening being at a distance from the said longitudinal axis, having a center on said longitudinal axis and radius equal to vertical distance of a recess middle from the longitudinal axis; the recess defining a circular arc; and (2) a projection;

ii) the second arrangement comprising:

(1) first and second parts protruding parallel to said longitudinal axis; and (2) the first part defining a circular arc of a circle similar to that of the circular arc of an associated recess of the first arrangement and being received in the associated recess; and (3) the second part having a circular arced, toothed surface concentric with said associated recess;

d) the recess being for guiding rotation of the parabolic reflector after receiving the first part; and the projection of the first arrangement engaging a respective one of a plurality of cavities of the toothed surface to secure the reflector in a respective one of a plurality of rotational positions.

11. The luminaire of claim 10, wherein each axially outwardly projecting part is parallel to said longitudinal axis.

12. The luminaire of claim 10, wherein the reflector comprises a single integrated part.

13. The luminaire of claim 10, wherein the first and second parts of the assembled component comprises a single integrated part.

14. The luminaire of claim 10, wherein a) the cavities of the toothed surface have a saw-tooth pattern; and b) a portion of the projection that engages a cavity of the toothed surface substantially conforms to the shape of the cavity.

15. A luminaire having a lamp and a reflector that is rotational about a longitudinal axis of rotation, comprising:

a) a luminaire housing with two longitudinal ends;

b) a parabolic reflector for a fluorescent lamp; the reflector being received in the luminaire and having two longitudinal ends;

c) each longitudinal end of the luminaire housing having a recess and a projection on an internal surface; the recess being at a distance from the said longitudinal axis, having a center on said longitudinal axis and radius equal to vertical distance of a recess middle from the longitudinal axis; the recess defining a circular arc;

d) each longitudinal end of the reflector having an assembled component cooperating with an associated recess and projection of the luminaire; each assembled component having first and second parts protruding parallel to said longitudinal axis; the first part defining a circular arc of a circle similar to that of the circular arc of an associated recess of the luminaire; the second part having a circular arced, toothed surface concentric with said associated recess; and e) the recess being for guiding rotation of the parabolic reflector after receiving the first part; and the associated projection of the first arrangement engaging a respective one of a plurality of cavities of the toothed surface to secure the reflector in a respective one of a plurality of rotational positions.

16. The luminaire of claim 15, wherein each axially outwardly projecting part is parallel to said longitudinal axis.

17. The luminaire of claim 15, wherein the reflector comprises a single integrated part.

18. The luminaire of claim 15, wherein the first and second parts of the assembled component comprises a single integrated part.

19. The luminaire of claim 15, wherein a) the cavities of the toothed surface have a in saw-tooth pattern; and b) a portion of the projection that engages a cavity of the toothed surface substantially conforms to the shape of the cavity.

* * * * *